(12) United States Patent
Nevorct et al.

(10) Patent No.: US 7,875,091 B2
(45) Date of Patent: Jan. 25, 2011

(54) RAPID TOOLING SYSTEM AND METHODS FOR MANUFACTURING ABRASIVE ARTICLES

(75) Inventors: Damien Nevorct, Worcester, MA (US); Gwo Swei, Vandalia, OH (US); Alain Zanoli, Avignon (FR)

(73) Assignee: Saint-Gobain Abrasives, Inc., Worcester, MA (US)

( * ) Notice: Subject to any disclaimer, the term of this patent is extended or adjusted under 35 U.S.C. 154(b) by 499 days.

(21) Appl. No.: 11/062,900

(22) Filed: Feb. 22, 2005

(65) Prior Publication Data

US 2006/0185257 A1 Aug. 24, 2006

(51) Int. Cl.
- C09K 3/14 (2006.01)
- B24D 3/00 (2006.01)
- B24D 11/00 (2006.01)
- B24D 18/00 (2006.01)
- D04H 1/16 (2006.01)

(52) U.S. Cl. .................. 51/298; 51/293; 264/113; 264/128

(58) Field of Classification Search .............. 51/298, 51/293, 295, 307–309; 451/540, 548; 425/130; 264/113, 128, 482
See application file for complete search history.

(56) References Cited

U.S. PATENT DOCUMENTS

| | | | |
|---|---|---|---|
| 3,058,223 A | 10/1962 | Schmidt et al. | |
| 4,507,188 A * | 3/1985 | Chu | 526/301 |
| 4,894,093 A * | 1/1990 | Aderhold et al. | 106/461 |
| 5,190,567 A | 3/1993 | Tamamaki et al. | |
| 5,243,790 A | 9/1993 | Gagne | |
| 5,477,025 A | 12/1995 | Everett et al. | |
| 5,571,297 A | 11/1996 | Swei et al. | |
| 5,621,445 A * | 4/1997 | Fong et al. | 347/87 |
| 5,626,639 A * | 5/1997 | King | 51/297 |
| 5,669,940 A | 9/1997 | Stubbs | |
| 5,731,046 A | 3/1998 | Mistry et al. | |
| 5,738,817 A | 4/1998 | Danforth et al. | |
| 5,742,883 A | 4/1998 | Girard et al. | |
| 5,782,682 A | 7/1998 | Han et al. | |
| 5,785,914 A | 7/1998 | Kress et al. | |
| 5,900,207 A | 5/1999 | Danforth et al. | |
| 5,902,441 A * | 5/1999 | Bredt et al. | 156/284 |
| 6,106,644 A * | 8/2000 | McCool et al. | 156/64 |
| 6,110,031 A | 8/2000 | Preston et al. | |
| 6,162,576 A | 12/2000 | Hagiwara et al. | |
| 6,203,861 B1 | 3/2001 | Kar et al. | |
| 6,209,420 B1 | 4/2001 | Butcher et al. | |
| 6,213,856 B1 | 4/2001 | Cho et al. | |
| 6,274,206 B1 | 8/2001 | Turchan et al. | |
| 6,293,980 B2 | 9/2001 | Wei et al. | |
| 6,319,108 B1 | 11/2001 | Adefris et al. | |

(Continued)

FOREIGN PATENT DOCUMENTS

DE    35 15 401 A1    11/1985

(Continued)

*Primary Examiner*—Jerry Lorengo
*Assistant Examiner*—Pegah Parvin
(74) *Attorney, Agent, or Firm*—Larson Newman & Abel, LLP; Joseph P. Sullivan

(57) ABSTRACT

A rapid structuring media cartridge includes a cartridge body, a first binder and first abrasive particles. The cartridge is operable to deposit successive patterned layers including the first binder and first abrasive particles to form an abrasive structure.

28 Claims, 8 Drawing Sheets

U.S. PATENT DOCUMENTS

| | | |
|---|---|---|
| 6,328,632 B1 | 12/2001 | Chopra |
| 6,371,842 B1 | 4/2002 | Romero |
| 6,372,178 B1 | 4/2002 | Tseng |
| 6,375,874 B1 * | 4/2002 | Russell et al. .................. 264/28 |
| 6,450,393 B1 | 9/2002 | Doumanidis et al. |
| 6,491,843 B1 * | 12/2002 | Srinivasan et al. .......... 252/79.1 |
| 6,544,892 B2 * | 4/2003 | Srinivasan et al. .......... 438/692 |
| 6,610,114 B2 * | 8/2003 | Towery et al. .................. 51/308 |
| 6,644,795 B2 * | 11/2003 | Lin et al. ...................... 347/87 |
| 6,652,256 B2 | 11/2003 | Coe |
| 6,702,954 B1 * | 3/2004 | Her et al. .................... 252/79.1 |
| 2001/0039175 A1 | 11/2001 | Golzarian et al. |
| 2002/0015654 A1 | 2/2002 | Das et al. |
| 2002/0172817 A1 | 11/2002 | Owens |
| 2002/0188504 A1 | 12/2002 | Whale |
| 2003/0132207 A1 | 7/2003 | Park et al. |
| 2003/0150169 A1 | 8/2003 | Annen |
| 2003/0207658 A1 | 11/2003 | Nevoret et al. |
| 2003/0209464 A1 | 11/2003 | Otsuka et al. |
| 2003/0213182 A1 | 11/2003 | Knapp et al. |
| 2004/0018802 A1 * | 1/2004 | Welygan et al. .............. 451/28 |
| 2004/0023078 A1 | 2/2004 | Rosenflanz et al. |
| 2004/0048559 A1 | 3/2004 | Park et al. |
| 2004/0072506 A1 | 4/2004 | Goetz |
| 2004/0267639 A1 | 12/2004 | McIntyre et al. |
| 2005/0060941 A1 | 3/2005 | Provow et al. |
| 2006/0207658 A1 | 9/2006 | Kohlmann et al. |

FOREIGN PATENT DOCUMENTS

| | | | |
|---|---|---|---|
| EP | 0266073 | * | 5/1988 |
| EP | 0 664 187 A | | 7/1995 |
| EP | 1 393 859 A | | 3/2004 |
| JP | H2-250775 | | 10/1990 |
| JP | H10-180792 | | 7/1998 |
| JP | H10-248856 | | 9/1998 |
| JP | H11-169765 | | 6/1999 |
| JP | 2001-001267 | | 1/2001 |
| JP | 2002-503559 | | 2/2002 |
| JP | 2004-338022 | | 12/2004 |
| WO | WO 97/28941 | | 8/1997 |
| WO | 99/42250 | | 8/1999 |
| WO | WO 01/64396 A1 | | 9/2001 |
| WO | WO 02/14018 A2 | | 2/2002 |

* cited by examiner

RAPID TOOLING SYSTEM AND METHODS FOR MANUFACTURING ABRASIVE ARTICLES

FIELD OF THE DISCLOSURE

This disclosure, in general, relates to rapid tooling systems and methods for manufacturing abrasive articles.

BACKGROUND

Abrasive articles, such as coated abrasives and bonded abrasives, are used in various industries to machine workpieces, such as by lapping, grinding, or polishing. Machining utilizing abrasive articles spans a wide industrial scope from optics industries, automotive paint repair industries, to metal fabrication industries. In each of these examples, manufacturing facilities use considerable quantities of abrasive articles during each business cycle.

In a typical business cycle, an abrasive article consumer orders a quantity of abrasive articles from an abrasive manufacturer. The abrasive manufacturer manufactures the abrasive article in a batch using a selected grain size and bonding material. The abrasive manufacturer may subsequently manufacture another batch of abrasive articles having a different grain size and bonding material.

Typically, it is difficult to fully clean the abrasive article manufacturing equipment to prevent contamination of a batch having a particular grain size with grains and particles used in a previous batch. When coarse grain abrasive particles contaminate a fine grain abrasive batch, use of the contaminated fine grain abrasive batch leads to scratching or scarring of surfaces being polished or ground. As such, great care is taken by abrasive manufacturers to limit cross-contamination of abrasive article batches, leading to increased cost.

Furthermore, customers order in batches. For high volume users, ordering in batches results in large working capital outlay, storage and logistics problems once a batch is received, and problems associated with anticipating abrasive article usage. If usage of the abrasive articles is underestimated, the consumer may run out of abrasive articles, resulting in lost productivity and lost revenue.

In addition, traditional methods for manufacturing abrasive articles produce excess waste and are limited in the shape and configuration of abrasive articles that may be formed through such methods. For example, when a particular contour of a coated abrasive is desired, a sheet of coated abrasive material is cut to match the contour, leaving a considerable amount of unused material as waste. When manufacturing a bonded abrasive article, traditional methods use a molding process that includes (i) preparing a batch of slurry, (ii) pouring the slurry into a mold, (iii) pressing and curing the slurry, (iv) de-molding, and (v) dressing to final size. To ensure that the final bonded abrasive article is not below a target size, excess factors are used throughout the manufacturing process. For example, excess slurry is made to ensure that the mold is fully filled. In addition, the mold is typically larger than the final size and the bonded abrasive article is trimmed to the final size in the dressing operation. As such, in both the coated abrasive and bonded abrasive manufacturing process, material is wasted and additional time consuming steps are performed to produce the final abrasive article.

In addition to improvements in abrasive article manufacturing and systems therefor, there continues to be demand in industry for new abrasive articles, including bonded and coated abrasive articles. By way of example, existing fabrication technology limits the architecture of abrasive articles, and in the context of engineered abrasives and bonded abrasives, typically abrasive structures are limited to structures that are easily detached from molding, such as conical or pyramidal shaped structures.

As should be clear from the foregoing, the abrasive industry would be receptive to improved fabrication technology as well as to new abrasive article structures.

SUMMARY

In one particular embodiment, a rapid structuring media cartridge includes a cartridge body, a first binder and first abrasive particles. The cartridge is operable to deposit successive patterned layers including the first binder and first abrasive particles to form an abrasive structure.

In another embodiment, a solid free form manufacturing system includes a computational circuitry, a cartridge including a first binder and first abrasive particles, and a production surface. The computational circuitry is configured to direct the cartridge to deposit successive patterned layers of the first binder and the first abrasive particles over the production surface to form an abrasive structure.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION OF THE DRAWINGS

Figure 1:
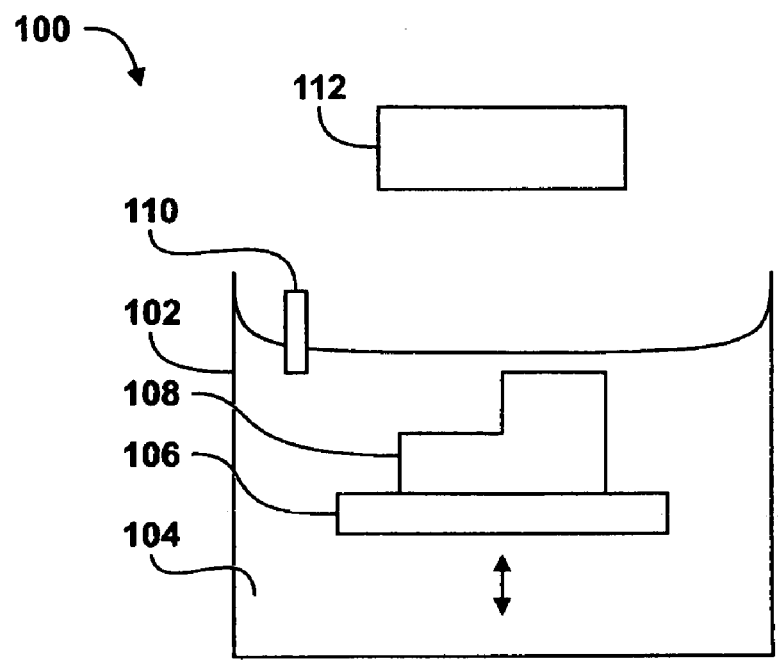
FIGS. 1 and 2 include diagrams illustrating exemplary immersion systems for rapid tooling of abrasive articles.

In one particular embodiment, the disclosure is directed to a system for manufacturing abrasive articles, such as a solid free form manufacturing system and a rapid tooling system. The system includes a computational circuitry, a cartridge and a production surface. The cartridge is removably coupled to the system, and abrasive particles and binder may be dispensed from the cartridge when the cartridge is engaged with the system. The computational circuitry is configured to control the deposition of or pattern in which the abrasive particles and binder are disposed on the production surface or substrate to form an abrasive article.

In another exemplary embodiment, the disclosure is directed to a cartridge that stores a binder and abrasive particles. The cartridge is configured to removably couple to a rapid tooling system for use in the manufacture of abrasive articles. The cartridge may further be configured to store a second binder and a second set of abrasive particles.

The disclosure is also directed to a method of forming an abrasive article. The method includes providing an abrasive article design data set to a rapid tooling system and forming an abrasive article based on the abrasive article design data set. The method further includes providing a second abrasive article design data set and forming a second abrasive article based on the second abrasive article design data set.

The disclosure is also directed to a method of facilitating abrasive article manufacturing. The method includes providing a rapid tooling system configured to accept a cartridge and providing the cartridge storing a binder and abrasive particles. The method may also include retrieving the used cartridge, refilling the cartridge with the binder and abrasive particles, and providing the refilled cartridge.

The abrasive articles may be coated abrasive articles or bonded abrasive articles. Coated abrasive articles include articles in which a layer or layers of abrasive are bonded to a substrate. The substrate or backing member serves as a dimensionally stable component on which an abrasive containing layer is deposited. Abrasive grains of the abrasive layer adhere to the backing member through the use of binder. Engineered or structured abrasives have been developed to provide improved performance over traditionally coated abrasives. Structured abrasives use a backing member over which an abrasive layer is deposited in order to conform a pre-configured pattern. Such structured abrasives generally exhibit enhanced grinding characteristics over conventional abrasive products, such as providing sustained cut-rate, consistent surface finish and extended life.

Bonded abrasives generally include three-dimensional forms that do not rely on a substrate or backing member for structural integrity. Bonded abrasives for example include grinding wheels and other three-dimensional abrasive articles. Traditionally, bonded abrasives have been formed through molding a mixture of abrasive particles and binder solutions.

As disclosed herein, coated abrasives and bonded abrasives may be formed through rapid tooling methods and solid free form manufacturing methods. Rapid tooling methods, for example, form an abrasive article, layer-by-layer, to produce an article having a desired grinding characteristic, such as sustained cut-rate, consistent surface finishing, useful life, porosity, and cutting fluid/swarf channeling.

Rapid tooling methods include immersion methods and printing methods. Immersion methods generally include a bath or container filled with build material, such as a resin or powder. An object is built, layer-by-layer, upon a platform that is lowered after each build layer is formed. A thin layer of uncured or unbound build material is deposited just above the last layer of the abrasive article and partially bound in a pattern. In exemplary embodiments, an energy source, such as a laser or UV light source, is directed in a pattern at the layer of unbound material to cause binder within the material to sinter or cure. In another exemplary embodiment, binder is printed in a pattern over the layers of build material. The object is then lowered, a subsequent layer of unbound material is deposited over the previous layer, and the unbound material is again solidified in a pattern to form an abrasive article.

Exemplary immersion methods include liquid methods and powder methods. For example, liquid methods include stereolithography in which an object is constructed in a pool of liquid resin. Powder methods include binder printing and selective laser sintering. For example, a layer of ceramic material may be bound in a particular pattern by printing binder over the layer in the particular pattern. In another example, powder material may be sintered in a particular pattern by directing a laser beam over a layer of powder material in the particular pattern.

Solid free forming and rapid tooling methods also include rapid printing methods. Rapid printing methods generally include the deposition of solutions in a pattern over a substrate. In one exemplary embodiment, an abrasive article is formed by the successive deposition of a solution including abrasive particles and binders. Exemplary printing methods include deposition printing methods and extrusion methods. Exemplary deposition methods include dry particle deposition methods, such as metal bonded systems, and liquid deposition methods, such as liquid curable resin systems. Extrusion methods include fused deposition machining (FDM) in which a filament of thermoplastic material is melted and deposited in a desired pattern.

Figure 2:
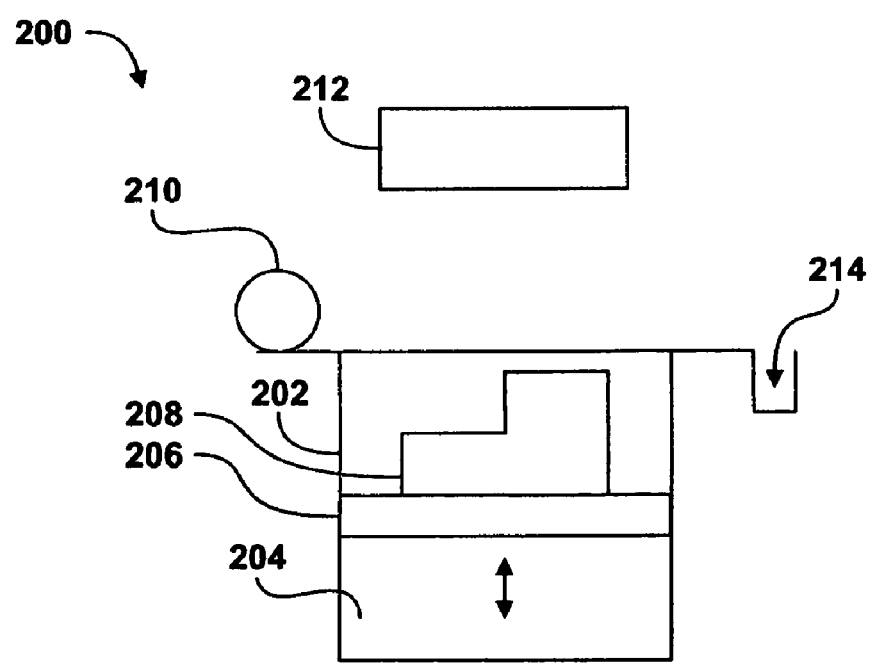

FIGS. 1 and 2 illustrate exemplary immersion systems for the formation of abrasive articles. The system 100 illustrated in FIG. 1 includes a bath 102 of uncured solution 104 including uncured resin and abrasive particles. An abrasive article 108 is formed on a platform 106. Energy source 112, such as a laser or ultraviolet (UV) energy source, directs energy in a pattern along a surface layer of the solution 104 to cure or bind the solution into a patterned layer. For example, a laser may be scanned across the surface layer to form the pattern on the surface of the solution 104. In another example, UV light is directed through a mask to form the pattern on the surface of the solution 104. The platform 106 is subsequently lowered fractionally and a bar or sweeper 110 sweeps a subsequent layer of uncured solution over the forming abrasive article 108. The process continues by directing a subsequent pattern of energy at the surface layer, lowering the platform 106 and sweeping an additional layer over a previously cured layer. Once the abrasive article 108 is complete, platform 106 is raised and the abrasive article 108 cleaned and rinsed with solvent. In one exemplary embodiment, the object may be further post-cured using thermal or UV methods.

The solution 104 includes abrasive particles and binder or curable resin. In one exemplary embodiment, the binder or curable resin is responsive to at least one of heat, laser irradiation, UV energy irradiation, e-beam irradiation or patterned light methods. By directing the energy or light in a pattern, a layer of an abrasive article can be formed. In one exemplary embodiment, the system illustrated in FIG. 1 includes a stereolithography system.

FIG. 2 illustrates an exemplary system 200 using a powder mixture. A container 202 includes a mixture 204 of abrasive particles and powder binder. The mixture 204 may include binders, such as ceramic powders, polymeric materials, such as polyamides and polystyrenes, steel and foundry sand. A platform 206 is lowered to permit formation of abrasive article 208 layer-by-layer. Once the platform has been lowered by fractions of an inch, a roller 210 deposits build material over the abrasive article 208 and the material 204 within the container 202. Excess material may be wiped or rolled into container 214.

An energy source 212 directs patterned energy on the surface of the material 204 to form a subsequent layer of abrasive article 208. In one exemplary embodiment, the energy source 212 is a laser light source directed in a pattern over material 204 and abrasive article 208. Alternatively, the material 204 is abrasive particles. Binder or adhesive is printed in a pattern over the forming abrasive article 208 and material 204 to form a layer of the forming abrasive article.

Subsequently, the platform 206 is lowered to allow the formation of a subsequent patterned layer. Once the abrasive article 208 is formed, the platform 206 is raised and the abrasive article 208 cleaned of unbound powder. Exemplary embodiments of the system illustrated in FIG. 2 include binder printing systems and selective laser sintering systems (SLS).

Figure 3:
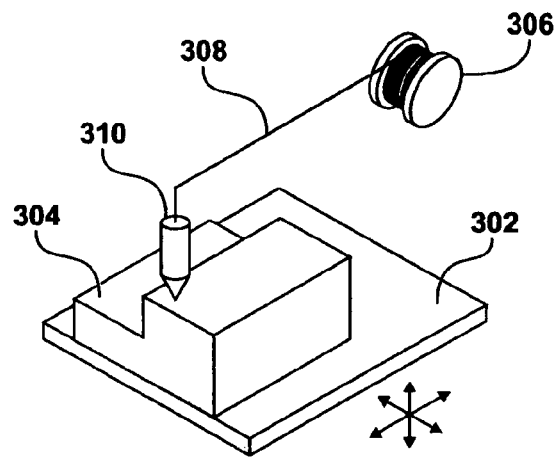
FIGS. 3, 4 and 5 include diagrams illustrating exemplary printing systems for manufacturing abrasive articles.
Figure 4:
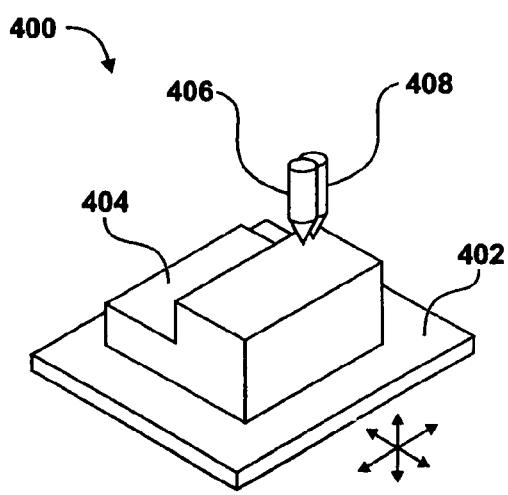
Figure 5:
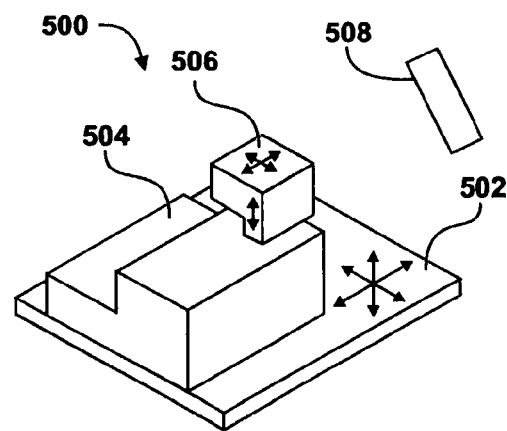

FIGS. 3, 4 and 5 illustrate exemplary printing systems. FIG. 3 illustrates a system 300 in which a filament of a thermoplastic material 308 is fed through a heated extrusion head 310. A platform 302 and/or the heated extrusion head 310 may move in a three-dimensional pattern to facilitate the formation of a three-dimensional abrasive article 304. A spool 306 includes the filament 308, which includes abrasive particles and the thermoplastic material that when heated temporarily melts and is deposited to form layers of the abrasive article 304. Exemplary thermoplastic materials include acrylonitrile-butadiene-styrene (ABS), polycarbonate, and polyphenylsulphone. In one particular embodiment, the system 300 illustrated in FIG. 3 is a fused deposition machining (FDM) system.

FIG. 4 illustrates an exemplary deposition printing system 400 in which powder is fused at locations on an abrasive article 404. A platform 402 and/or a deposition head 406 are moved in a three-dimensional pattern to facilitate the formation, layer-by-layer, of abrasive article 404. In one particular embodiment, a laser, high-intensity light source, or radiative heat source is directed through the deposition head 406 and powder is directed through tube 408 to converge on the surface of abrasive article 404. The powder is sintered, melted, or cured in a pattern to form the abrasive article 404. The powder may be deposited as a single stream of powder including abrasive particles and binder or as two or more converging streams, one including abrasive particles and another including binder. Exemplary binders include metals, such as steel, copper, titanium, or aluminum. In one example, the process includes depositing a stream of powdered metal and abrasives while simultaneously heating the deposition area with a laser to fuse the powder to the abrasive article 404.

FIG. 5 illustrates another exemplary deposition printing system 500 that includes printing of successive layers to form an abrasive article 504. A platform 502 and/or a print head 506 are moved in a three-dimensional pattern to facilitate deposition of a resin-based solution in a patterned layer to form the abrasive article 504. The resin-based solution is subsequently cured to facilitate the formation of the abrasive article 504. In one exemplary embodiment, the printing method includes a resin-based deposition method that prints a UV curable acrylide solution including abrasive particles in a patterned build layer. Subsequently, the build layer is exposed to UV light from an energy source, such as a radiation source 508. In one exemplary embodiment, the print head 506 deposits one or more solutions in patterns in order to facilitate formation of abrasive articles having desired shapes and microfeatures, such as locally controlled porosity, engineered cleavage planes, and swarf channels.

The systems described above in relation to FIGS. 1-5 and, in particular, the rapid tooling printing systems, may be adapted to receive a cartridge. The cartridge may be removably coupled to the system and house binder and abrasive particles. In one example, the cartridge includes a container for storing a solution or mixture of abrasive particles and binder. For example, the solution may be a slurry of liquid binder and abrasive particles. Alternatively, the solution is a powdered mixture of abrasive particles and powder binder. In a further exemplary embodiment, the cartridge includes a spool for storing a filament composition including thermoplastic binder and abrasive particles.

Figure 6:
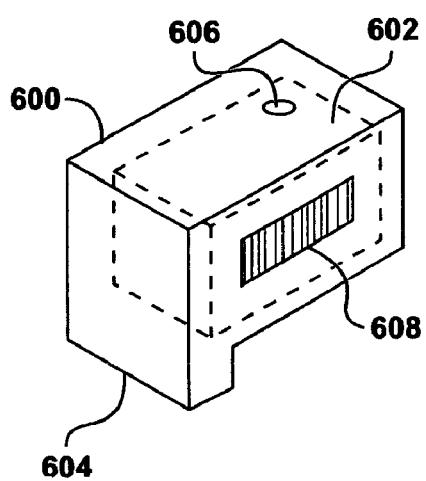
FIGS. 6 and 7 include diagrams illustrating exemplary cartridges for use in systems for rapid tooling of abrasive articles.

FIG. 6 illustrates one particular embodiment 600 of a rapid structuring media cartridge for use in a printing-type rapid tooling system. Generally, the cartridge is operable to successively deposit binder and/or abrasive grains in successive layers to form an abrasive structure, such as a coated abrasive structure or a bonded abrasive structure. For example, the cartridge 600 may removably couple to a deposition printing rapid tooling system. The cartridge 600 includes a container 602 and a dispensing nozzle 604. The cartridge 600 may also include a refill port 606 and may include a unique identifier 608.

The cartridge 600 is configured to store a binder and abrasive particles. In one exemplary embodiment, the binder and abrasive particles may be combined together in a common compartment, such as container 602, in the cartridge body. The binder and abrasive particles are dispensed from a common nozzle, such as nozzle 604. If the binder is liquid, the abrasive particles and binder form a solution, such as a slurry of liquid binder and solid abrasive particles. If the binder is particulate, the abrasive particles and binder form a particulate mixture.

In one exemplary embodiment, the binder is radiatively curable. For example, the binder may be curable through exposure to an e-beam, to a laser source or to diffuse light, such as UV light. In another exemplary embodiment, a solution of the binder and abrasive particles further includes a second binder that is curable using alternative methods, such as thermal curing and chemically induced curing.

In one exemplary embodiment, the dispensing nozzle or orifice 604 is selectively controlled to dispense material. For example, the dispensing nozzle 604 may form a portion of a print head. As such, the nozzle 604 includes mechanisms for controlling the dispensing of a solution. Exemplary mechanisms include heater-driven bubble jet mechanisms, electrostatic mechanisms, and piezoelectric mechanisms. Alternatively, the orifice 604 provides material to a print head that is separate from the cartridge.

Figure 7:
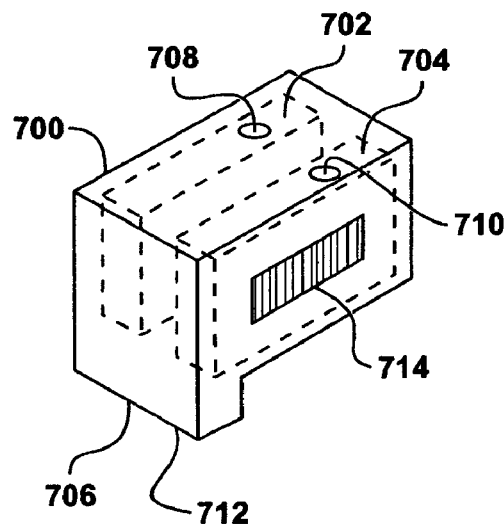

FIG. 7 illustrates an exemplary cartridge 700 that includes two or more containers, 702 and 704. The cartridge 700 also includes one or more dispensing nozzles (706 and 712) and one or more refill ports (708 and 710). In one exemplary embodiment, the binder and abrasive particles are separated from each other in dedicated compartments, such as containers 702 and 704. The compartments may be configured to dispense the binder and abrasive particles through a common nozzle, such as nozzle 706. For example, the cartridge 700 may include dispensing structures configured to combine the first binder and first abrasive particles prior to dispensing such that the first binder and the first abrasive particles are dispensed through one nozzle. In another example, the compartments may be configured to dispense the binder and abrasive particles through separate nozzles, such as nozzles 706 and 712.

In another exemplary embodiment, a container, such as container 702, includes a solution having a first set of abrasive particles and a first uncured binder. A second solution stored in container 704 includes a second uncured binder and, optionally, includes a second set of abrasive particles. In one particular embodiment, the second binder exhibits post-cure mechanical properties, such as post-cure mechanical strength, that are different from the post-cure mechanical properties of the first binder. The second set of abrasive particles may have a different composition, average grain size, morphology, performance and/or hardness than the first abrasive particles. As a result, abrasive articles produced with the first solution have different performance characteristics, such as wear resistance and material removal rate, than abrasive articles produced with the second solution. Additionally, regions within an article produced with different ratios of the first and second solution have different performance characteristics.

In a further example, the abrasive article is a coated abrasive article. The cartridge may deposit the first binder to form a make coat and a second binder to form a size coat. The cartridge may also include a third binder in a third container.

The third binder may, for example, be deposited to form a supersize coat of the coated abrasive article.

Alternatively, the second solution stored in container 704 includes a curing agent. For example, the curing agent may induce the first binder to polymerize, crosslink or solidify. In another embodiment, the second solution may act as a diluent, reducing the density of abrasive particle placement or altering the mechanical strength of the first binder.

In a further example, the second solution stored in container 704 includes an adhesive for forming a pressure-sensitive adhesive backing to an abrasive article. For example, the second solution may be deposited on a release film to form the pressure-sensitive adhesive backing. The binder and abrasive particles may be deposited over the adhesive backing to form the abrasive article. The abrasive article may be removed from the release film and pressed to surfaces of grinding, polishing, or fining equipment.

The one or more refill ports (708 and 710) may be used by a consumer, a service provider or a manufacturer to refill the cartridge 700. In one exemplary embodiment, the consumer may specify to the service provider or manufacturer the binder and abrasive particles with which the cartridge should be filled. For example, the consumer may enter the unique identifier 714 into a website and specify the desired binder and abrasive particles with which the cartridge 700 associated with the unique identifier 714 should be filled. The consumer may then send the cartridge 700 to the service provider or manufacturer.

As illustrated in FIGS. 6 and 7, the cartridge is configured for use in a 3-D deposition printing apparatus. In other embodiments, the cartridge is configured for use in a FDM system, selective laser sintering system, or metal deposition system. In alternative embodiments, the containers are spools for storing thermoplastic filaments or are configured to store powdered mixtures.

In another exemplary embodiment, cartridges are selectively coupled to the rapid tooling system or solid free form manufacturing system. For example, a cartridge storing one composition can be replaced with a cartridge storing a different composition to produce abrasive articles with different characteristics.

In general, the solutions, mixed powders and filaments may be formed with a binder and set of abrasive particles. In the case of a solution, the binders may take the form of curable resins, such as resins curable via energetic methods, such as e-beam, microwave, laser, and UV curing methods. Alternatively, the binders are curable via chemical methods, such as catalyst induced or moisture induced methods, or via thermal methods.

A particularly useful UV-curable binder composition contains constituents chosen from the group of acrylate and methacrylate oligomers and monomers. Useful oligomers include epoxy acrylates, aliphatic urethane acrylates, aromatic urethane acrylates, polyester acrylates, aromatic acid acrylates, epoxy methacrylates, and aromatic acid methacrylates. Monomers include mono-, di-, tri-, tetra-, and pentafunctional acrylates and methacrylates, such as trimethylopropane triacrylate, trimethylolpropane triacrylate, tris(2-hydroxy ethyl) isocyanuarate triacrylate, tripropylene glycol diacrylate, hexanediol diacrylate, octyl acrylate, octyl acryl ate, and decyl acryl ate. The binder formulation may include substantial amounts of acrylate monomers containing 3 or more acrylate groups per molecule. Typically commercial products include, trimethylopropane triacrylate (TMPTA) and pentaerythritol triacrylate (PETA). The relative amounts of di- and tri-functional acrylates as well as higher molecular weight acrylate oligomers may be adjusted along with the other components to give desired rheological properties for processing and desired toughness and cutting characteristics of the end product after cure.

The radiant power of the source of actinic light can be provided by any conventional UV source. For example, the coatings or build layers may be exposed to UV light generated from V, D, H, or H+ bulbs, or a combination thereof at an energy output ranging from 100 watts per inch of width to 600 watts per inch of width.

Further, coupling agents may be utilized to improve the bonding between the binder and the abrasive grains. Typical coupling agents include organosilanes, for example A-174 and A-1100 available from Osi Specialties, Inc., and organotitanates and zircoaluminates. A particular group of coupling agents includes amino silanes and methacryloxy silanes.

Fillers can be incorporated into the dispersion to modify the rheology of the dispersion and the hardness and toughness of the cured binders. Examples of useful fillers include: metal carbonates, such as calcium carbonate, sodium carbonate; silicas such as quartz, glass beads, glass bubbles; silicates such as talc, clays, calcium metasilicate; metal sulfate such as barium sulfate, calcium sulfate, aluminum sulfate; metal oxides such as calcium oxide, aluminum oxide (such as in the form of boehmite and/or pseudo-boehmite); and aluminum trihydrate.

The dispersion may comprise a grinding aid to increase the grinding efficiency and cut rate. Useful grinding aids can be inorganic based, such as halide salts, for example sodium cryolite, potassium tetrafluoroborate, etc.; or organic based, such as chlorinated waxes, for example polyvinyl chloride. A particular embodiment includes cryolite and potassium tetrafluoroborate with particle size ranging from 1 to 80 micron, and most preferably from 5 to 30 micron. The weight percent of grinding aid ranges from 0 to 50%, and most preferably from 10-30% of the entire formulation (including the abrasive components).

In addition to the above constituents, other components may also be added: typically a photoinitiator such as a benzoin ether, benzil ketal, α-alkoxy-acetophenone, α-hydroxyalkylphenone, α-amino alkylphenone, acyl phosphine oxide, benzophenone/amine, thioxanthone/amine, or another free radical generator; anti-static agents, such as graphite, carbon black, and the like; suspending agents, such as fumed silica; anti-loading agents, such as zinc stearate; lubricants, such as wax; wetting agents; dyes; fillers; viscosity modifiers; dispersants; and defoamers.

In alternative rapid tooling systems or in combination with the above-described binders, various thermal curable polymers may be utilized. While thermoplastic and thermoset polymers may be utilized, oftentimes thermoset polymers are emphasized due to their stable nature, particularly in the context of cutting or finishing operations that generate excessive heat. According to a particular embodiment, the binder compound includes a powder, typically formed principally of powder or even essentially entirely powder. In some embodiments, liquid thermally curable polymers are used. In other embodiments, liquid thermally curable polymers are excluded in favor of powder. Powder form thermal curable binders are particularly advantageous in some embodiments, as such may be incorporated into a process for forming coated abrasives fairly easily. Indeed, use of a powdered thermal-curable binder is particularly advantageous for creation of abrasive dispersions used for forming structured abrasives. Moreover, it has been found that use of thermal curable components in powder form in conjunction with other liquid binder systems has been demonstrated to provide improved abrasive performance in the end product, as well as providing abrasive dispersions that have improved processability due at least in part to beneficial changes in the viscosity of the dispersions. Examples of thermal curable polymers include epoxy resins, urethane resins, phenolic resins, urea/formaldehyde, melamine/formaldehyde, acrylic resins, polyester resins, vinyl, and mixtures thereof. It is understood that such resins are available in either liquid or powder form, and that in some particular embodiments, powdered or particulate form is preferably used.

In other exemplary embodiments, the binder may include powder build materials, such as thermoplastics, metals, and resin-coated ceramics. Resin-coated ceramics include resin-coated sand, such as foundry sand. Such binders may be useful in selective laser sintering techniques. Particularly useful powdered metals include steel, copper, titanium, and aluminum. Powdered metals may be used in metal deposition methods, such as methods performed by the apparatus illustrated in FIG. 4. Useful thermoplastic binders include polyamide, ABS, polycarbonate, polystyrene, polyvinylchloride and polyphenylsulphone. Such, thermoplastic binders may also be used in FDM systems, such as the system illustrated in FIG. 3.

Binder printing methods may use liquid adhesives that cure through drying or upon contact with underlying material. In alternative embodiments, the binder may be moisture activated.

The abrasive grains may be formed of any one of or a combination of known abrasive grains, including alumina (fused or sintered), zirconia, zirconia/alumina oxides, silicon carbide, garnet, diamond, cubic boron nitride and combinations thereof. Particular embodiments have been created by use of dense abrasive grains comprised principally of alpha-alumina. The abrasive particles generally have an average particle size from 1 to 150 micron, and more typically from 1 to 80 micron. For fining and polishing applications, the average particle size may be about 1-16 micron, such as about 3-5 microns. In general, however, the amount of abrasive present provides from about 10 to about 90%, such as from about 30 to about 80%, of the weight of the formulation.

In coated abrasive and engineered abrasive embodiments, a backing member may be formed of flexible but mechanically stable materials, including various polymer films, paper and other cellulosic materials, and fabrics including cotton and polyester with various polymeric saturants. The fabrics may be woven or non-woven fabrics. A particular type of backing member or substrate is polyethylene terephthalate film. Other polymeric films include polycarbonate films. The backing members may be primed or pre-treated to promote adhesion between the abrasive layer and the backing member. Alternatively, the backing member may be a release film, such as for use in the manufacturing of abrasive articles with pressure sensitive adhesive backing.

Figure 8:
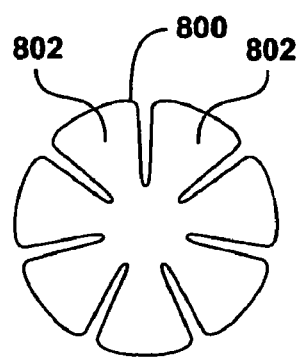
FIGS. 8, 9, 10, 11, 12, 13, 14, 15, 16, 17, 18 and 19 include diagrams illustrating exemplary abrasive articles.
Figure 9:
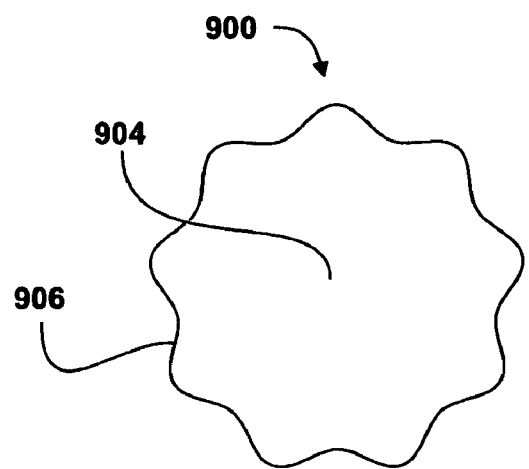

In one particular embodiment, the rapid tooling system and cartridge may be used to form coated abrasive and engineered abrasive articles. Such abrasive articles may be formed on demand as desired without expenses associated with storage and batch ordering. For example, the rapid tooling system may be used to form coated abrasives having distinct patterns. FIGS. 8 and 9 illustrate exemplary rosette designs 800 and 904 that include petal-like structures 802 and 906. Patterned printing of such designs 800 and 904 results in the printing of a specific contour on a substrate without the additional mess or waste associated with printing a full sheet and stamping or cutting the desired shape or contour.

In one particular example, the optics industry may use such rapid tooling systems for manufacturing abrasive articles useful in polishing lenses and optical surfaces. In the optics industry, the single use of a particular coated sheet is common. Alternatively, for applications such as paint removal and sanding, longer life is desired. To produce longer life, rapid tooling of a coated abrasive article may include forming multiple layers or using stronger binder.

Performance characteristics of the abrasive may be controlled based on location across the coated abrasive article. For example, the density of abrasive particles may be adjusted for differences in relative velocity between regions of the adhesive article. In the abrasive article illustrated in FIG. 8, abrasive placement may be adjusted to provide a desired removal rate over a curved surface, such as in ophthalmic fining applications. In the abrasive article illustrated in FIG. 9, abrasive placement and density may be adjusted radially along the petal-like structures 906 of the rosette design 904 to adjust for differences in rotational velocity. The density may be adjusted by placing additional layers of abrasive in locations in which greater abrasive density is desired. Alternatively, the number of drops or pixels of an abrasive solution per unit area may be adjusted to create differences in performance characteristics. Different abrasive solutions that have different performance characteristics may be applied to different regions of a pattern or in varying amounts at locations across an abrasive article.

Figure 10:
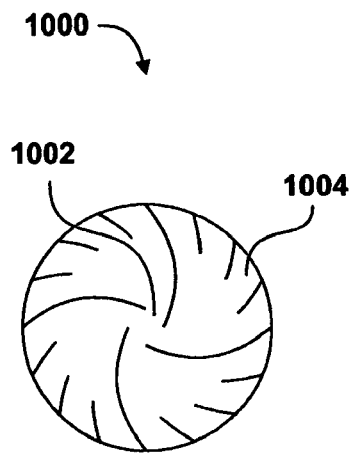

Another method to adjust performance characteristics includes adjusting patterns of solution placement. FIG. 10 illustrates an exemplary pattern of solution placement that may adjust local wear rates to compensate for rotational velocity difference extending along a radius. In the pattern 1000, the distance between lines near center 1002 is greater than the distance between lines near the outer edge 1004.

Turning to engineered and structured abrasives, prior art methods for forming engineered abrasive articles are generally limited to articles that have outer surfaces having good mold-release contours, such as positively sloping walls including pyramidal shapes and conical shapes. Generally, non-engineered coated abrasives are considered two-dimensional because the thickness of a given feature is small relative to the cross-section of that feature. In contrast, engineered and structured abrasives and bonded abrasives have features that are significantly thick relative to the cross-section of the feature, presenting additional manufacturing considerations. In particular, rapid tooling methods described herein permit formation of abrasive articles having outer surface contours that generally have poor mold-release characteristics, such as negatively sloping walls and vertical walls. A negatively sloping wall has a contour that slopes inward toward the center of a structure with decreasing height and a positively sloping wall has a contour that slopes outward from the center of a structure with decreasing height. For example, a pyramid has a positively sloping wall and an inverted pyramid has a negatively sloping wall. Vertical walls are also difficult to produce using traditional methods for forming engineered abrasives. Herein, the term "generally negative slope" is used to include negative sloping contours and vertical contours, wherein the abrasive structures have at least one wall having a slope that extends along an angle α (alpha) from −90° to 0° relative to a normal direction extending from the outer surface of the abrasive article.

Figure 11:
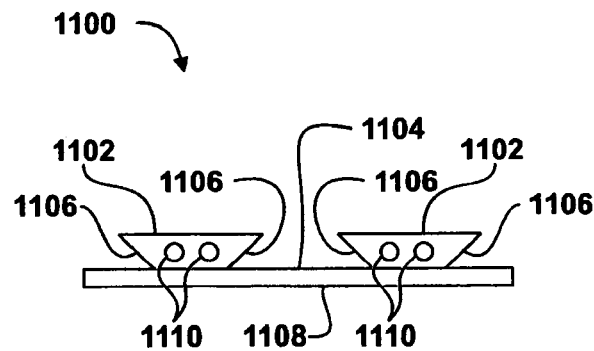
Figure 12:
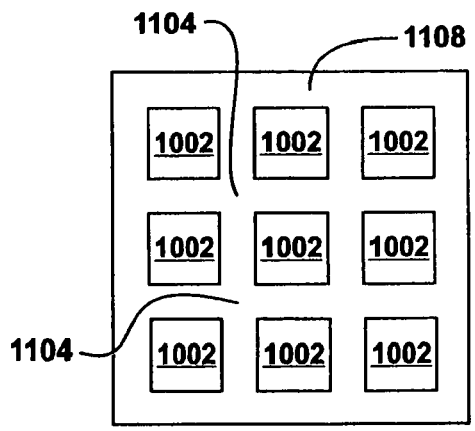

FIGS. 11 and 12 include illustrations of an engineered abrasive article 1100 that includes a pattern or array of abrasive structures 1102. The abrasive structures 1102 include negatively sloping walls 1106. As a result, the abrasive structures 1102 are wider on top than where they contact the substrate 1108. Such a contour has poor mold-release characteristics.

Figure 13:
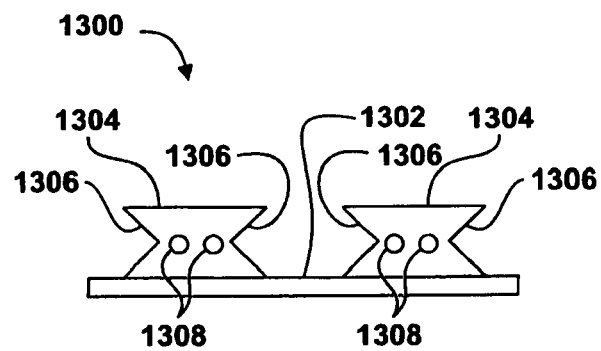

Walls or contours that include portions that have a generally negative slope exhibit poor mold-release characteristics. FIG. 13 includes an illustration of an abrasive article 1300 that includes a pattern of abrasive structures 1304 formed over a substrate 1302. The abrasive structures 1304 have walls that include negatively sloping portions 1306.

Rapid tooling methods also permit formation of microfeatures or integrated internal features within abrasive structures. For example rapid tooling methods allow formation of structured pores and channels within and on abrasive structures.

Returning to FIGS. 11 and 12, the pattern of abrasive structures 1102 form macrochannels 1104 between the structures 1102. Rapid tooling methods allow the formation of microfeatures, such as structured channels, pores and cleavage planes. Generally, macrofeatures are features formed globally by the pattern of structures or between structures and microfeatures are features formed in or on the abrasive structures themselves. For example, FIG. 11 illustrates microfeatures, such as internal structured pores 1110, within an abrasive structure 1102, and macrofeature channel 1104 is formed by the pattern of structures or between structures 1102. The abrasive article may include a repeated pattern of abrasive structures having a pattern of one or more internal structured pores. Similarly, FIG. 13 illustrates internal structured pores 1308 within abrasive structures 1304.

The internal structured pores (e.g. 1110 and 1308) may have precisely controlled dimensions and shapes. For example, the internal structured pores have geometric cross-sections selected from a group consisting of polygonal, circular and irregular. Polygonal includes square, triangular, rectangular, rhomboid, trapezoidal, and pentagonal. Irregular shapes include, for example, "D" shaped, semicircular, and star-shaped. The internal structured pores may have dimensional variability not greater than about 50 microns, such as not greater than about 8 microns. Dimensional variability refers to variability of pore dimension within a set of abrasive structures. In addition, the internal structured pores may have locational variability (i.e. variability of pore location within a set of abrasive structures) not greater than about 50 microns, such as not greater than about 8 microns. In these examples the microfeature pores are internal to the structures. Alternatively, the microfeature pores and channels may be formed in the outer contours of the structures.

Figure 14:
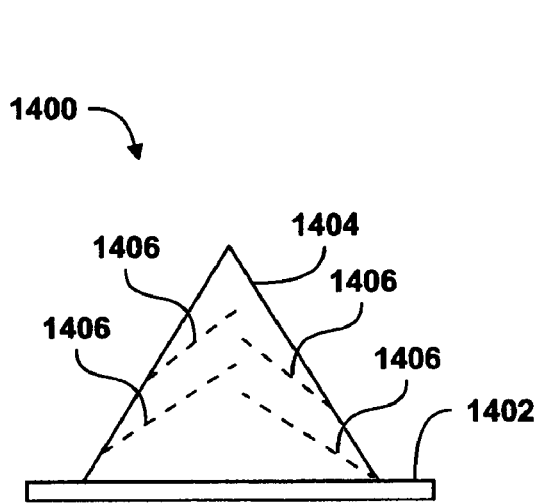

In another example, rapid tooling may produce abrasive structures with microfeatures, such as engineered cleavage planes. For example, as illustrated in FIG. 14, the abrasive structure 1404 may include engineered cleavage planes 1406. As illustrated, the cleavage planes 1406 are not horizontal or vertical and terminate part way through a structure. When the abrasive 1404 is in use, the abrasive structure 1404 is designed to periodically cleave or fissure along a plane 1406, providing improved abrasion and sharper angles. Such cleavage planes 1406 may also be used to reduce surface area over which the abrasive contacts a surface, increasing the pressure exerted by the abrasive surface. In the example illustrated in FIG. 14, the abrasive structure 1404 may be formed over a substrate 1402. Alternatively, the abrasive structure 1404 may be formed as a bonded abrasive structure.

In further exemplary embodiments, the concentration of abrasive particles within abrasive structures may be varied as a function of distance normal to the surface of a backing. For example, in a pyramidal structure, the concentration of abrasive particles may be higher nearer the backing and lower away from the backing.

Rapid tooling techniques may also be used to form bonded abrasive articles. Here too, rapid tooling techniques can be used to form abrasive articles having microfeatures and poor mold release contours.

Figure 15:
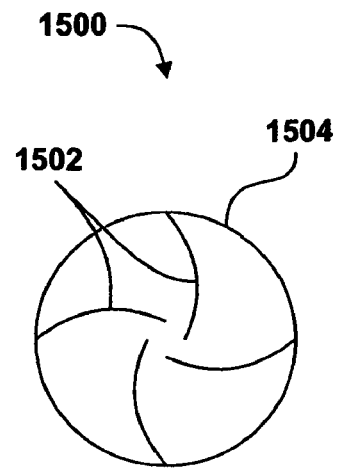
Figure 16:
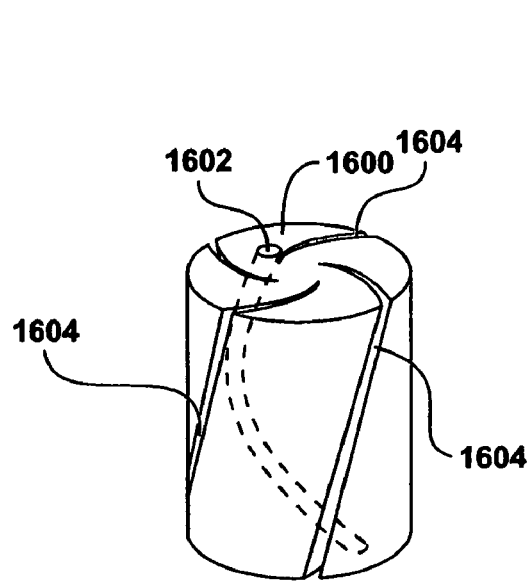

In the exemplary embodiment illustrated in FIG. 15, cutting fluid channels 1502 may be formed in a cylindrical or wheel-shaped bonded abrasive article 1500. In one exemplary embodiment, the cutting fluid channels 1502 is a helical structure that is designed to encourage flow of cutting fluid through the channels 1502 to grind surface 1504 during usage. An alternative embodiment is illustrated in FIG. 16 in which a bonded abrasive article includes a cutting fluid channel 1602 and swarf channels 1604. The cutting fluid channel 1602 is designed to facilitate flow of the cutting fluid to surface 1600 and swarf channels 1604 are designed to remove swarf material from the surface 1600 when the abrasive article is in use. The swarf channels 1604 have curved cross sections and cross sections that are not straight and, as a result, the contour of the abrasive article 1600 has poor mold-release characteristics.

In one particular embodiment, the abrasive article includes a feature, such as a swarf channel 1604, extending into the bonded abrasive article from the outer surface of the bonded abrasive article. The feature has a feature aspect ratio at least about 1.5, wherein the feature aspect ratio is the depth of the feature extending inwardly from the outer surface to a minimum feature opening dimension at the outer surface of the bonded abrasive article. For example, the feature aspect ratio may be at least about 2.5, such as at least about 3.5.

Particular embodiments of abrasive articles that include cutting fluid channels allow delivery of cooling fluids and lubricants to grind interfaces. Typical prior art systems direct cooling fluid to grind interfaces through external tubes. However, the fluid often does not sufficiently lubricate or coat the surface. As such, the surface may be excessively hot and may include excess swarf, resulting in poor material removal rates and surface quality. In contrast, particular embodiments of the abrasive articles described herein include cutting fluid channels that deliver cooling and lubricating fluids directly to the grinding interface. Moreover, such cutting fluid channels may be shaped to force fluid onto the surface with movement (e.g. rotation) of the abrasive article and may be shaped to allow delivery of cutting fluid even as the abrasive article experiences wear.

Figure 17:
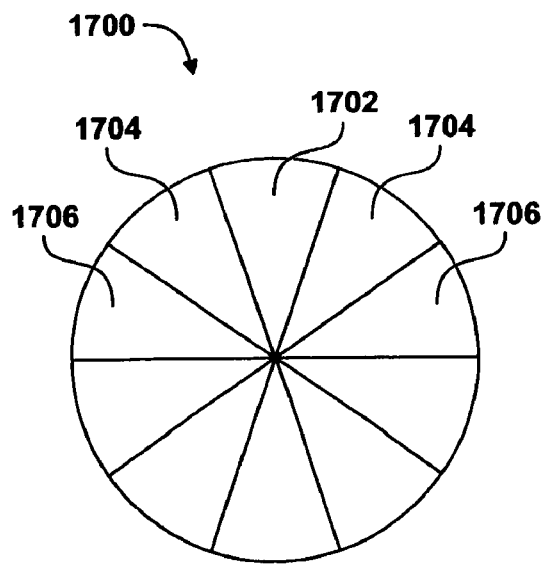
Figure 18:
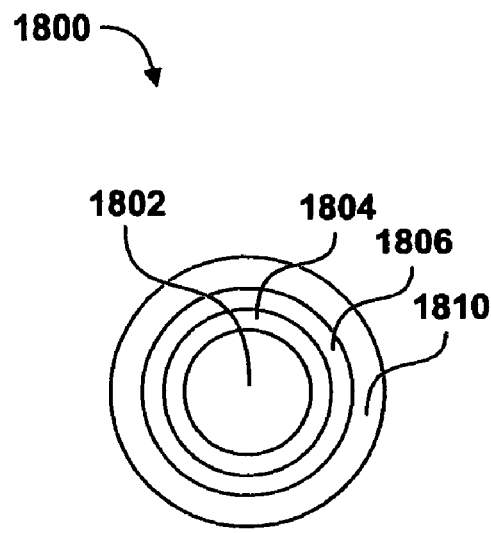

As illustrated in FIG. 17, a bonded abrasive article may include regions having different abrasive particles or different concentrations of abrasive particles. For example, a cylindrical or wheel shaped bonded abrasive article 1700 may include regions, such as regions 1702, 1704, and 1706, having different abrasive characteristics, such as particle density, porosity, bond strength, elastic modulus, and compressive modulus. In this example, region 1702 may have one concentration of abrasive particles and region 1704 may have a different concentration. The different regions (1702, 1704, and 1706) may be formed using different abrasive solutions or by applying abrasive solutions in different proportions. Alternatively, the regions may vary based on distance from the center of an abrasive article, as illustrated in FIG. 18. Different regions (e.g. 1802, 1804, 1806, and 1810) may be formed using different abrasive solutions or by applying abrasive solutions in different proportions and may exhibit different grinding and mechanical properties. In one particular embodiment, the concentration of abrasive particles may be locally controlled based on distance from center or based on desired wear patterns within the article. Such a bonded abrasive article may have patterned layers wherein, within a layer, a first region has a first composition and a second region has a second composition different from the first composition.

Figure 19:
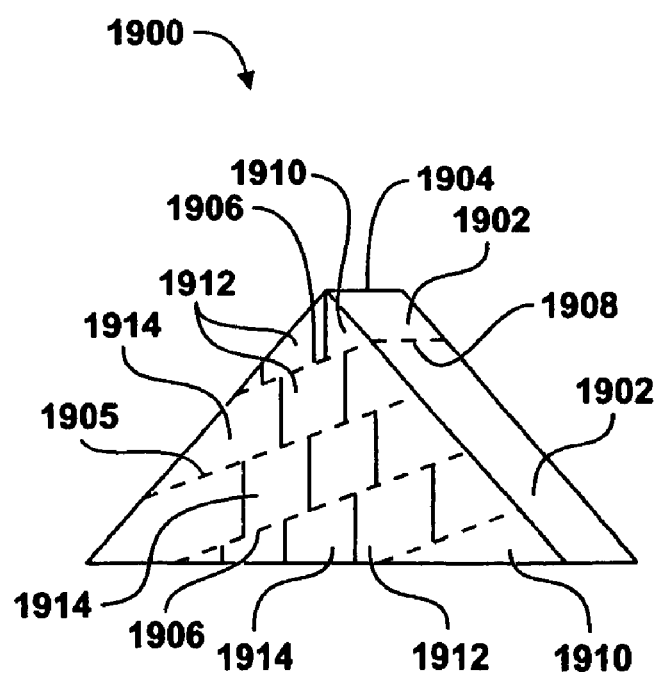

Features may be combined in an abrasive article to provide enhanced abrasive performance. FIG. 19 includes an illustrative example including several features, such as cleavage planes and variations in composition. For example, the abrasive article 1900 includes compositions 1902, 1910, 1912, and 1914. The article 1900 also includes cleavage planes 1906. As the abrasive article wears, the article periodically cleaves at cleavage planes 1906, exposing an abrasive surface, such as abrasive surface 1908. In one exemplary embodiment, the abrasive surface 1908 has a surface area approximately equal to the initial abrasive surface 1904. In one particular embodiment, the abrasive composition 1902 has high bond strength. The other material compositions 1910, 1912 and 1914 function to support the abrasive surface when forces are applied normal to the abrasive surface. The other material compositions 1910, 1912, and 1914 may vary in bond strength, elasticity, abrasive quality, and wear rate.

Generally, the rapid tooling system and the rapid structuring media cartridge can be adapted to form three-dimensional abrasive structures that include features selected from the group consisting of microfeatures, three-dimensional abrasive features, a pattern of cutting fluid channels, a pattern of swarf channels, a pattern of internal voids, and oriented breakage planes.

In one particular embodiment, the rapid tooling system and removable cartridge may be used to provide on-demand manufacturing capabilities for consumers of abrasive articles. Such on-demand tooling, allows consumers to reduce inventory of abrasive articles and insures a ready supply of such articles.

In another exemplary embodiment, use of rapid tooling for manufacturing abrasive articles reduces waste and mess associated with traditional methods. For example, a coated abrasive article may be produced by coating a limited area of an underlying substrate. In this manner, only the regions useful in making or producing the coated abrasive article are coated with abrasive and binder, whereas other regions are left uncoated. In such a case, use of abrasive and binder is reduced.

In a further exemplary embodiment, rapid tooling and removable cartridges for abrasive articles reduces the likelihood of contamination of an abrasive article with abrasive particles from an alternate run of abrasive articles. Consumers may be supplied with a cartridge that includes the solution, powder, or filament having only those abrasive particles and abrasive particle sizes in which the consumer is interested. By selection of a particular binder solution and a desired abrasive particle, the consumer can produce a desired abrasive article without contamination or mess.

Rapid tooling systems for producing abrasive articles are particularly adapted to form abrasive articles for fining and polishing applications. For example, such systems provide for on-demand production of single use fining abrasives for applications, such as the ophthalmic lens production and electronics production. Abrasive particles for such applications may have an average particle size about 3-5 micron and build layers as fine as about 16 microns. Such systems may also be useful in producing abrasive articles for polishing, such as jewelry applications and polished sample preparation, and paint removal applications.

Consumer-side manufacturing of abrasive articles may be facilitated by providing a consumer with a rapid tooling system and cartridges filled with abrasive compositions. The consumer may be an internal consumer of abrasive articles, such as a consumer that uses abrasive articles and produces the abrasive articles for internal consumption. Alternatively, the consumer may manufacture abrasive articles for sale and distribution.

Figure 20:
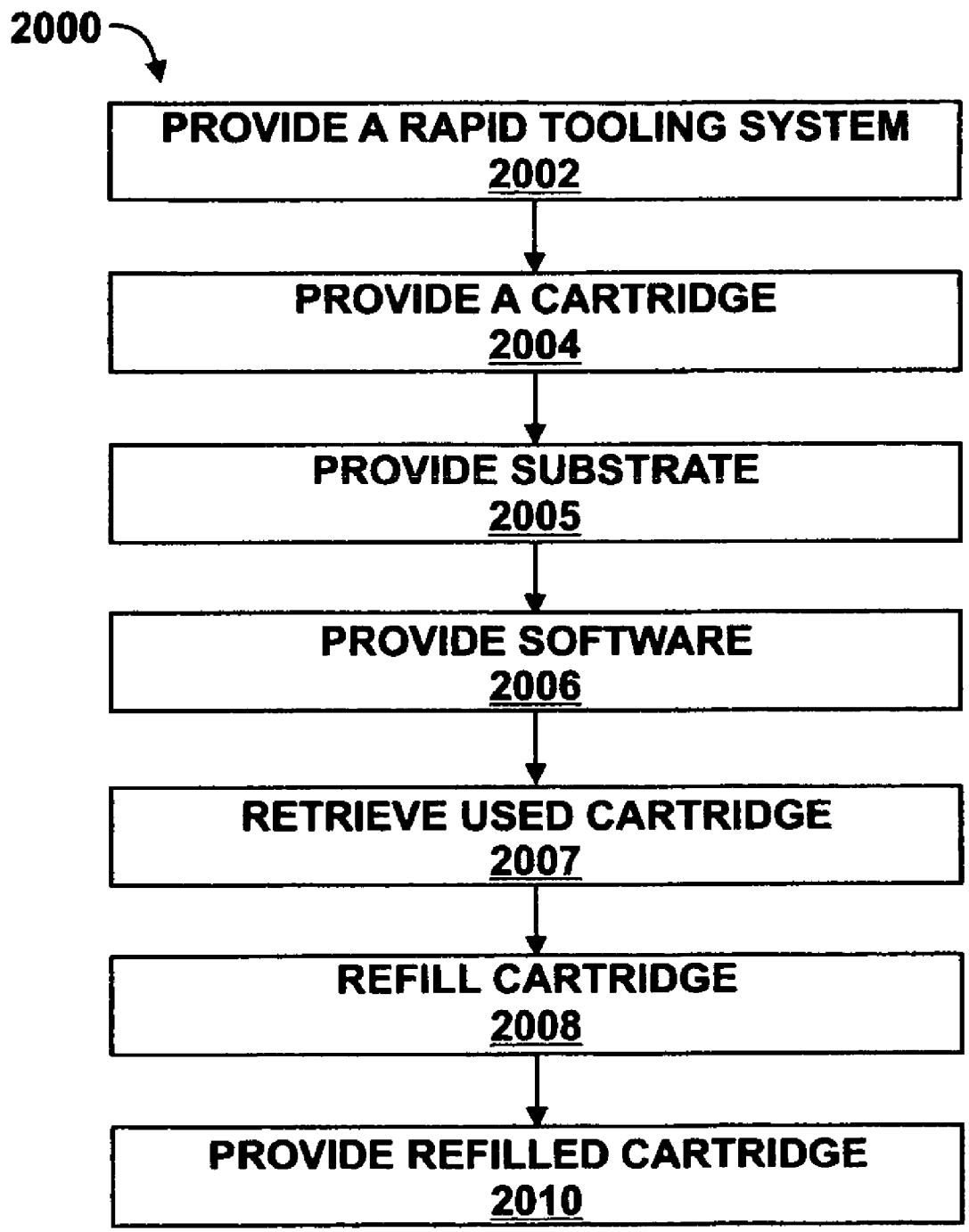
FIGS. 20 and 21 include flow diagrams illustrating exemplary methods for manufacturing abrasive articles.

In an exemplary method illustrated in FIG. 20, a rapid tooling system is provided to a customer, as illustrated at 2002. For example, a rapid tooling system for manufacturing abrasive articles may be leased or sold to a consumer of abrasive materials. Alternatively, the rapid tooling system for producing the abrasive article may be loaned or given to a prospective consumer.

A cartridge including abrasive particles and binder is provided to the consumer, as illustrated at 2004. For example, a consumer may select a particular binder and particle grain size or grain type of abrasive particle. The abrasive solution manufacturer may provide a cartridge having a solution having the particular binder and the desired abrasive particles, directly or indirectly, to the consumer. In one particular embodiment, the consumer may purchase the cartridge. In another particular embodiment, the consumer may purchase the solution, powder or filaments provided in the cartridge.

When configured to form coated and engineered abrasive articles, a substrate may be provided, as illustrated at 2005. For example, the substrate may be selected from the group consisting of paper, film, fabric, foil, and foam. The rapid tooling system may be configured to deposit successive layers of abrasive particles and binder over the substrate to form an abrasive article using the cartridge.

In addition, the consumer may be provided with computer-implemented instructions and software operable by the rapid tooling system to control deposition of the first binder and the first abrasive particles in the successive patterned layers, as illustrated at 2006. For example, the consumer may be provided with software and data configured to instruct the rapid tooling system to form a particular abrasive structure design.

A consumer utilizes the cartridge and the rapid tooling system to manufacture the desired abrasive articles. In so doing, the cartridge is depleted of its solution, powder or filaments. In one exemplary embodiment, a manufacturer or a service provider directly or indirectly retrieves the used cartridge, as illustrated at 2007.

Alternatively, the consumer may send the cartridge to the service provider or manufacturer. In one particular example, the cartridge may be provided in a package configurable for sending the cartridge to the service provider or manufacturer. For example, the cartridge may be sent by a mail carrier, such the US Postal Service®, FedEx®, or UPS® in a package. The package may include a return address and return postage area. The consumer may reconfigure the package for return, insert the cartridge and send it via the mail carrier. In addition, the cartridge may include a unique identifier. The consumer may log on to a website, provide the unique identifier, and specify the type of binders and abrasive particles desired. In one embodiment, the manufacturer sends a second cartridge with the desired binders and abrasive particles. In another embodiment, the manufacturer or service provider refills the cartridge with the desired binder and abrasive particles, as illustrated at 2008. However, if the cartridge is worn or inoperable, the cartridge may be replaced.

Subsequently, the service provider or manufacturer directly or indirectly provides the refilled cartridge, as illustrated at 2010, to a consumer, such as to the consumer from which the cartridge was retrieved or to a different consumer. For example, the service provider or manufacturer may send the cartridge via a mail carrier in a returnable package.

Figure 21:
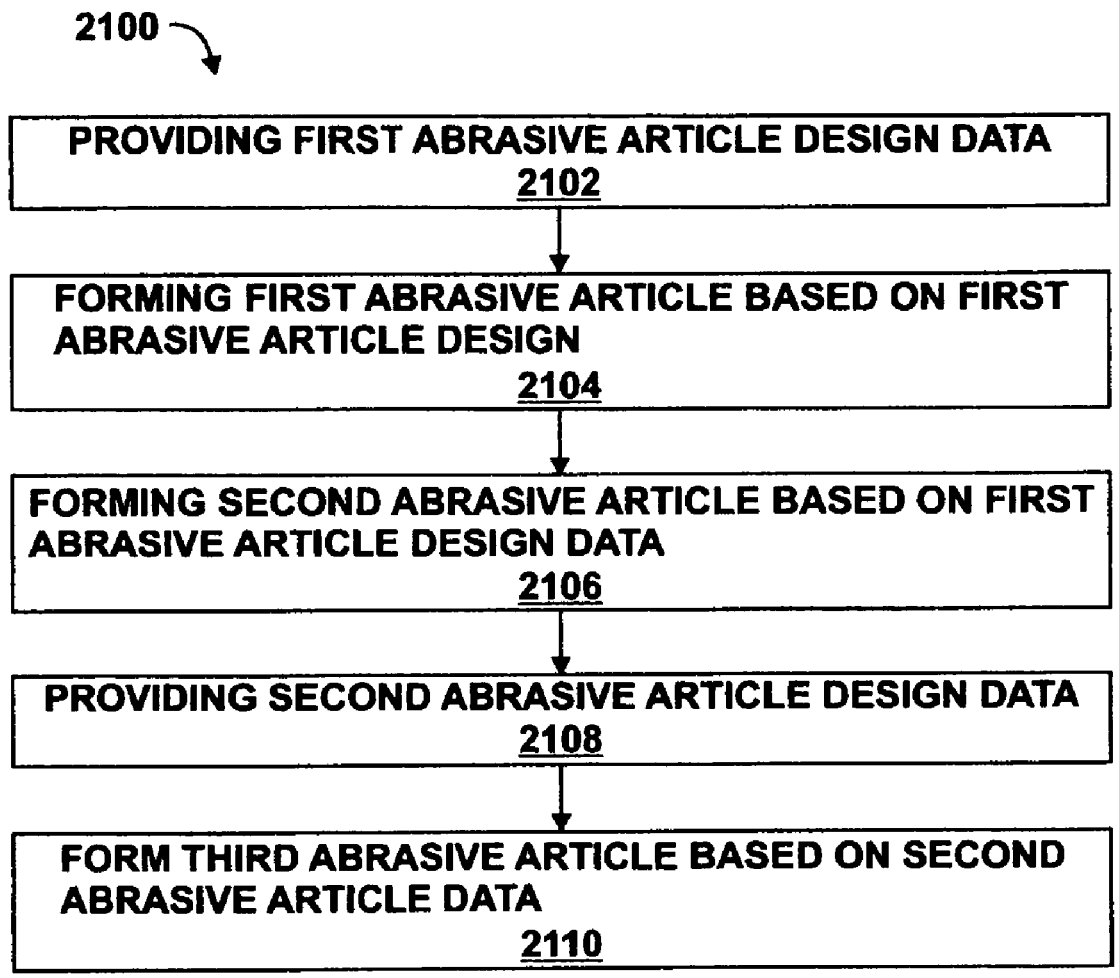

From the consumer's perspective, the rapid tooling system and removable cartridge may be used to produce one or more designs of abrasive articles. For example, as illustrated in FIG. 21, a consumer of abrasive articles provides design data for a first abrasive article design to the rapid tooling system, as illustrated at 2102. The consumer then forms a first abrasive article based on the first abrasive article design data, as illustrated at 2104, and may optionally produce additional abrasive articles, such as a second abrasive article, based on the first abrasive article design data, as illustrated at 2106. The consumer may provide another set of design data for a second abrasive article design, as illustrated at 2108, and may subsequently form a third abrasive article based on the second abrasive article design data, as illustrated at step 2110.

As abrasive articles are manufactured, the cartridge may become depleted. The consumer may replace the cartridge and continue producing abrasive article. In one particular embodiment, a consumer may exchange cartridges having different compositions in and out of the rapid tooling system to produce abrasive articles having different performance characteristics. For example, a consumer may select a cartridge based on the mechanical strength of the binder, based on the particle size and wear resistance of the abrasive particles, or based on the wear resistance of the cured binder and abrasive particle solution. The consumer can place the selected cartridge into the rapid tooling system to produce the abrasive article having the desired performance characteristics. Empty cartridges may be provided to a service provider or manufacturer for refilling.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A rapid structuring media cartridge comprising:
   a cartridge body;
   a first binder stored within the cartridge body
   a second binder stored within the cartridge body; and
   first abrasive particles stored within the cartridge body, the cartridge operable to deposit both the first binder and the first abrasive grains in patterns in successive layers to form an abrasive structure.

2. The rapid structuring media cartridge of claim 1, wherein the first binder and the first abrasive particles are combined together in a common compartment in the cartridge body.

3. The rapid structuring media cartridge of claim 2, wherein the first binder comprises liquid binder and wherein the first binder and the first abrasive particles form a slurry.

4. The rapid structuring media cartridge of claim 2, wherein the cartridge body comprises a first nozzle and wherein the first binder and the first abrasive particles are dispensed together through the first nozzle.

5. The rapid structuring media cartridge of claim 1, wherein the abrasive structure forms a portion of a coated abrasive article, the cartridge operable to deposit the first binder as a make coat of the coated abrasive article and the second binder in a size coat of a coated abrasive article.

6. The rapid structuring media cartridge of claim 1, wherein the cartridge is operable to deposit the first binder and the second binder in the successive layers to form the abrasive structure.

7. The rapid structuring media cartridge of claim 6, further comprising second abrasive particles.

8. The rapid structuring media cartridge of claim 1, wherein the first binder is curable by a mechanism selected from the group consisting of chemically curable, thermally curable, and radiatively curable.

9. The rapid structuring media cartridge of claim 8, wherein the first binder is ultraviolet radiatively curable.

10. The rapid structuring media cartridge of claim 1, wherein the cartridge body includes a nozzle.

11. The rapid structuring media cartridge of claim 10, wherein the nozzle includes a mechanism selected from a group consisting of electrostatic mechanisms, bubble jet mechanisms, or piezoelectric mechanisms.

12. The rapid structuring media cartridge of claim 1, wherein the abrasive structure is a coated abrasive structure.

13. The rapid structuring media cartridge of claim 1, wherein the abrasive structure is a bonded abrasive structure.

14. The rapid structuring media cartridge of claim 1, wherein the rapid structuring media cartridge is adapted to form the abrasive structure to include features selected from the group consisting of three-dimensional abrasive features, a pattern of swarf channels, a pattern of internal voids, and a pattern of oriented breakage planes.

15. The rapid structuring media cartridge of claim 1, wherein the abrasive particles are selected from the group consisting of alumina, zirconia, zirconia/alumina oxides, silicon carbide, garnet, diamond, cubic boron nitride, and combinations thereof.

16. The rapid structuring media cartridge of claim 1, wherein the abrasive particles have an average particle size of 3 microns to 5 microns.

17. The rapid structuring media cartridge of claim 1, wherein further comprising a filler incorporated with the binder, the filler selected from the group consisting of metal carbonates, silicas, silicates, metal sulfate, and aluminum trihydrate.

18. A rapid structuring media cartridge comprising:
    a cartridge body;
    a first binder stored within the cartridge body; and
    first abrasive particles stored within the cartridge body, the cartridge operable to deposit both the first binder and the first abrasive grains in patterns in successive layers to form an abrasive structure;
    wherein the first binder and the first abrasive particles are separated from each other in dedicated compartments in the cartridge body.

19. The rapid structuring media cartridge of claim 18, further comprising dispensing structures configured to combine the first binder and first abrasive particles prior to dispensing such that the first binder and the first abrasive particles are dispensed through one nozzle.

20. A rapid structuring media cartridge comprising:
    a cartridge body;
    a first binder stored within the cartridge body;
    first abrasive particles stored within the cartridge body, the cartridge operable to deposit both the first binder and the first abrasive grains in patterns in successive layers to form an abrasive structure; and
    a curing agent physically separated from the first binder, the cartridge operable to successively deposit the first binder and the curing agent in the successive patterned layers to form the abrasive structure.

21. A solid free form manufacturing system comprising:
    a computational circuitry;
    a cartridge comprising a cartridge body, a first binder within the cartridge body, a second binder stored within the cartridge body, and first abrasive particles within the cartridge body; and
    a production surface, the computational circuitry configured to direct the cartridge to deposit the first binder and the first abrasive grains in patterns in successive layers of the first binder and the first abrasive particles over the production surface to form an abrasive structure.

22. The solid free form manufacturing system of claim 21, wherein the first binder and the first abrasive particles are combined together in a common compartment in the cartridge.

23. The solid free form manufacturing system of claim 22, wherein the first binder comprises liquid binder and wherein the first binder and the first abrasive particles form a slurry.

24. The solid free form manufacturing system of claim 21, further comprising a radiation source.

25. The solid free form manufacturing system of claim 24, wherein the radiation source is a UV radiation source.

26. The solid free form manufacturing system of claim 21, wherein the cartridge is removably coupled to the solid free form manufacturing system.

27. The solid free form manufacturing system of claim 21, wherein the abrasive particles have an average particle size of 3 microns to 5 microns.

28. The solid free form manufacturing system of claim 21, wherein the production surface is movable relative to the cartridge to permit layer-by layer deposition of the first binder and the first abrasive grains.

* * * * *

UNITED STATES PATENT AND TRADEMARK OFFICE
CERTIFICATE OF CORRECTION

| | | |
|---|---|---|
| PATENT NO. | : 7,875,091 B2 | Page 1 of 1 |
| APPLICATION NO. | : 11/062900 | |
| DATED | : January 25, 2011 | |
| INVENTOR(S) | : Nevorct et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1052 days.

Signed and Sealed this
Fourteenth Day of June, 2011

David J. Kappos
*Director of the United States Patent and Trademark Office*